United States Patent Office 2,739,984

Patented Mar. 27, 1956

1

2,739,984

TETRA-SUBSTITUTED DIAMINO ALKANES

Franz Häfliger and Walter Schindler, Basel, Switzerland, assignors to J. R. Geigy A. G., Basel, Switzerland, a Swiss firm No Drawing. Application June 9, 1952, Serial No. 292,578

Claims priority, application Switzerland June 15, 1951

1 Claim. (Cl. 260—570.5)

This invention concerns new pharmacologically active tetra-substituted diamino alkanes and quaternary ammonium salts derived therefrom.

It has now been found that the new tetrasubstituted diamino alkanes of the general formula:

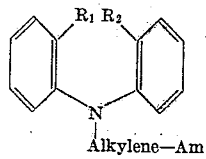

wherein $R_1$ represents a methyl or ethyl group, $R_2$ represents a methyl group or hydrogen, Alkylene represents an alkylene radical with from 2–6 carbon atoms, and Am represents a low molecular dialkylamino radical, or an alkyleneimino radical with 5–6 ring members, possess useful pharmacological properties, e. g. anti-allergic and sedative activity, whereas the quaternary ammonium salts derived therefrom and corresponding with the general formula:

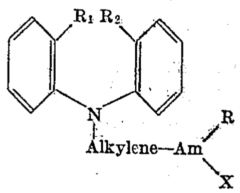

wherein

R represents an aliphatic or araliphatic hydrocarbon radical,

X represents the radical of a hydrohalic or alkylsulphuric acid, and $R_1$, $R_2$, alkylene and Am have the meanings given above have a spasmolytic action.

The new compounds can be produced by reacting a diarylamine of the general formula:

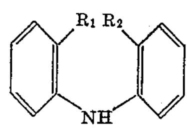

in the presence of acid binding agents with a reactive ester of an alcohol of the general formula:

HO—Alkylene—Am whereby $R_1$, $R_2$, alkylene and Am have the meanings given above. In particular sodium amide, lithium amide, potassium amide, sodium, and potassium are suitable as acid binding agents by means of which advantageously the diarylamine can be converted into its alkali salt immediately before the reaction. It is advantageous to perform the reaction in inert organic solvents such as e. g. benzene, toluene or xylene while heating.

2

In particular, the halides come into question as reactive esters of amino alcohols of the general formula:

HO—Alkylene—Am

They may be listed as follows: dimethylamino ethyl chloride, diethylamino ethyl chloride, methylethylamino ethyl chloride, piperidino ethyl chloride, pyrrolidino ethyl chloride, β-dimethyl-amino-propyl chloride, β-dimethylamino-isopropyl chloride, γ-dimethylamino-propyl chloride, δ-dimethylamino-butyl chloride, di-n-propylamino-ethyl chloride, methyl-isopropylamino-ethyl chloride, di-isobutylamino-ethyl chloride, di-n-butylamino-ethyl chloride or the corresponding bromides or iodides.

The tertiary bases form water soluble salts with inorganic or organic acids such as hydrochloric acid, hydrobromic acid, sulphuric acid, phosphoric acid, methane sulphonic acid, ethane disulphonic acid, acetic acid, citric acid, malic acid, succinic acid, tartaric acid, benzoic acid, phthalic acid.

The quaternary ammonium salts of the general formula given above result from the addition in the usual manner of halides or sulphates of aliphatic or araliphatic alcohols, e. g. of methyl iodide, dimethyl sulphate, ethyl bromide or benzyl chloride to the tetra-substituted diamino alkanes.

The new compounds can be used in therapeutics.

The following examples illustrate the production of the new compounds. Parts are given as parts by weight and the relationship of parts by weight to parts by volume is that of grammes to cubic centimetres. The temperatures are in degrees centigrade.

*Example 1*

A suspension of 4 parts of sodium amide in 12 parts by volume of abs. toluene is added dropwise at 40–50° to a solution of 20 parts of di-o-tolylamine in 100 parts by volume of abs. benzene. On completion of the addition, the whole is stirred for an hour at 80°, after which the temperature is reduced to 40° and 15 parts of diethylamino-ethyl chloride are added dropwise within half an hour. The mixture is boiled for 16 hours under reflux while stirring, then cooled and water is added. The benzene layer is removed and washed three times with water whereupon the basic portions of the benzene layer are extracted by shaking out four times with 2N hydrochloric acid. The acid extracts are made alkaline with concentrated caustic soda lye while cooling with ice and extracted with ether. The ether solution is washed twice with water and dried over sodium sulphate. After evaporating the ether, the residue is distilled in the high vacuum. 21 parts of N-(β-diethylamino-ethyl)-di-o-tolylamine are obtained in this way. B. P. 175–176° under 0.15 mm. pressure.

*Example 2*

3 parts of sodium amide in a benzene suspension are added dropwise at 40–50° to a solution of 10 parts of di-o-tolylamine and 15 parts of β-dimethylamino-propyl chloride in 100 parts by volume of abs. benzene. The whole is then boiled for 16 hours under reflux. On working up as described in Example 1, about 10 parts of N-(β-dimethylamino-propyl)-di-o-tolylamine are obtained. B. $P_{0.3}$ 165–166°. On the addition of alcoholic hydrogen chloride solution to the base, its hydrochloride is obtained. When recrystallised from boiling alcohol it melts at 210–220°.

*Example 3*

20 parts of di-o-tolylamine are dissolved in benzene and added to the benzene solution of the freed base of 17 parts of γ-dimethylamino-propyl chloride-hydrochloride. A suspension of 4.2 parts of sodium amide in toluene is added dropwise at 40–50° and then the whole is boiled under reflux for 16 hours. After cooling, the mixture is filtered through a charcoal filter. The solvents are evaporated from the clear filtrate and the residue is distilled in the high vacuum. N-(γ-dimethyl-amino-propyl)-di-o-tolyl amine passes over at 145–146° under 0.1 mm. pressure.

*Example 4*

A solution of 16 parts of γ-piperidino-propyl chloride in 50 parts by volume of abs. benzene is added to a solution of 18 parts of N-o-tolyl-aniline in 30 parts by volume of abs. benzene. The whole is heated to 40–45° when a suspension of 4 parts of sodium amide in 20 parts by volume of toluene are added dropwise while stirring whereupon the mixture is boiled under reflux for 10 hours. After cooling, the mixture is filtered through a little charcoal, the solvents are evaporated and the residue is fractionated in a high vacuum. N-(γ-piperidino-propyl)-N-o-tolyl aniline passes over at 165–167° under 0.6 mm. pressure. The hydrochloride melts at 211–212°.

The following compounds, for example can also be produced according to the methods mentioned in the description or the previous examples:

N-(β-piperidino-ethyl)-di-o-tolyl-amine, hydrochloride M. P. 252–253°.
N-(β-pyrrolidino-ethyl)-di-o-tolyl-amine, B. P. 154–156°, hydrochloride M. P. 222–223°.
N-(β,β-dimethyl-γ-piperidino-ethyl)-di-o-tolyl-amine, B. $P_{0.2}$ 154–156°, hydrochloride M. P. 216–218°.
N-(β-dimethylamino-ethyl)-di-o-tolyl-amine, hydrochloride M. P. 242–243°.
N-(β-dimethylamino-ethyl)-N-o-tolyl-aniline, hydrochloride M. P. 268–270°.
N-(β-diethylamino-ethyl)-N-o-tolyl-aniline, hydrochloride M. P. 173–174°.
N-(β-dimethylamino-propyl)-N-o-tolyl-aniline, hydrochloride M. P. 238°.
N-(β-dimethylamino-propyl)-N-(o-ethyl-phenyl)-aniline, hydrochloride M. P. 226°.
N-(β-di-n-propylamino-ethyl)-di-o-tolyl-amine,
N-(β-di-n-butylamino-ethyl)-di-o-tolyl-amine,
N-(β-2-methylpiperidino-ethyl)-di-o-tolyl-amine,
N-(β-dimethylamino-sec. butyl)-di-o-tolyl-amine,
N-(ω-dimethylamino-hexyl)-di-o-tolyl-amine,
N-(ω-piperidino-hexyl)-di-o-tolyl-amine,
N-(β-pyrrolidino-ethyl)-N-o-tolyl-aniline,
N-(β-di-n-butylamino-ethyl)-N-o-tolyl-aniline,
N-(β-2.5-dimethylpyrrolidino-ethyl)-N-o-tolyl-aniline, N-(γ-dimethylamino-propyl)-N-o-tolyl-aniline,
N-(ω-dimethylamino-hexyl)-N-o-tolyl-aniline,
N-(β-dimethylamino-ethyl)-N-(o-ethylphenyl)-aniline,
N-(β-diethylamino-ethyl)-N-(o-ethylphenyl)-aniline,
N-(β-di-n-butylamino-ethyl)-N-(o-ethylphenyl)-aniline,
N-(β-piperidino-ethyl)-N-(o-ethylphenyl)-aniline,
N-(γ-dimethylamino-propyl)-N-(o-ethylphenyl)-aniline,
N-(γ-piperidinopropyl)-N-(o-ethylphenyl)-aniline,
N-(ω-dimethylamino-hexyl)-N-(o-ethylphenyl)-aniline.

*Example 5*

27 parts of N-dimethylaminoethyl-di-o-tolyl-amine are dissolved in 35 parts by volume of abs. alcohol and poured into 14 parts (6.1 parts by volume) of methyl iodide. The solution is allowed to stand for 24 hours whereupon the N-[β-(di-o-tolyl-amino)-ethyl]-N.N.N.-trimethylammonium iodide crystallises out. It is recrystallised from a little abs. alcohol and ether and then melts at 199–201°.

What we claim is:

A compound selected from the group consisting of the tetra-substituted diaminoalkane corresponding to the formula:

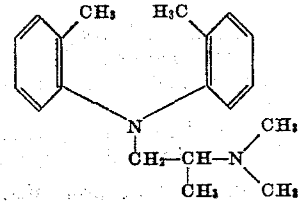

and its salts.

References Cited in the file of this patent

UNITED STATES PATENTS

| | | |
|---|---|---|
| 2,505,133 | Miescher et al. | Apr. 25, 1950 |
| 2,554,736 | Haefliger et al. | May 29, 1951 |

OTHER REFERENCES

Idson: Chem. Reviews, vol. 47 (1950) pp. 435–443 and 506.